United States Patent [19]

Boyd

[11] 4,296,551
[45] Oct. 27, 1981

[54] RACHETING PIPE CUTTER

[76] Inventor: Leroy Boyd, 1900 Fox Ave., Moore, Okla. 73160

[21] Appl. No.: 102,821

[22] Filed: Dec. 10, 1979

[51] Int. Cl.³ .................... B23D 21/06; B26B 27/00
[52] U.S. Cl. ........................................ 30/98; 30/99
[58] Field of Search ................................ 30/99, 98

[56] References Cited

U.S. PATENT DOCUMENTS

| 1,715,921 | 6/1929 | Himes | 30/98 |
| 1,737,889 | 12/1929 | McKnight et al. | 30/99 |
| 2,379,177 | 6/1945 | Pavey | 30/99 |
| 3,290,779 | 12/1966 | Bridges et al. | 30/99 |

FOREIGN PATENT DOCUMENTS

| 1543435 | 9/1968 | France | 30/99 |
| 50231 | 2/1932 | Norway | 30/99 |

Primary Examiner—Stephen G. Kunin
Assistant Examiner—J. T. Zatarga
Attorney, Agent, or Firm—Christopher H. Morgan

[57] ABSTRACT

A ratchet pipe cutter having a pipe-receiving body and a lever arm for turning the pipe-receiving body. The pipe-receiving body is cylindrical and has a turning gear at one end and cutting wheels for cutting pipe at the other end. The pipe-receiving body comprises two longitudinal portions joined by a hinge to allow the body to be opened and closed about a pipe. The hinge of said pipe-receiving body is located between the turning gear and the pipe cutting wheels. The lever arm has an annular interior groove for receiving the turning gear and a pawl for engaging the turning gear in a ratchet motion.

10 Claims, 7 Drawing Figures

RACHETING PIPE CUTTER

BACKGROUND OF THE INVENTION

1. Field of the Invention

The present invention relates, in general, to pipe cutters and more particularly to ratchet pipe cutters for use in confined areas.

2. Description of the Prior Art

In the field of pipe cutting it is often necessary to cut pipes located in awkward and confined areas. For example, a pipe which is located in a corner with very little clearance behind the pipe presents an especially difficult cutting problem. A similar type of problem is presented when the pipe must be excavated before cutting. In such situations it is desirable to excavate only to the pipe and not far beyond as would be required to allow clearance completely around the pipe for a pipe cutter. Therefore a ratchet pipe cutter whose lever arm must travel only through a short arc is a greater advantage for cutting pipes in these confined areas.

Typical ratchet pipe cutters of the past are shown in U.S. Pat. Nos. 135,644; 784,445; 996,602; 1,117,225 and 3,252,218. Each of these pipe cutters has a pipe receiving part and a lever arm. The lever arm is used to actuate a pawl which engages ratchet teeth. This much of the ratchet pipe cutting art is common. However, a major problem with each of these prior art devices is presented in placing the pipe cutter in position on the pipe. The manner in which this problem has been treated gives insight into the difficulty of achieving a satisfactory solution.

In patents to Haynes (U.S. Pat. No. 135,644) and Braun (U.S. Pat. No. 3,252,218), the pipe-receiving part of the cutter is divided into two interlocking portions. The two portions slide into engagement to form the pipe-receiving body. This however, is a disadvantage since a relatively long section of pipe must be exposed in order to allow sliding engagement of the two parts. Another disadvantage is that the cutting members which extend from the pipe-receiving body are not amenable to sliding on a pipe. Therefore, retraction of these cutters is required during the sliding engagement of the parts. Yet another disadvantage is the requirement of machining the parts to fine tolerances for a snug fit. Without such a snug fit the parts wear quickly and the cutters do not contact the pipe properly.

In patents to Sylvester (U.S. Pat. No. 784,445), Anderson (U.S. Pat. No. 996,602) and Nash (U.S. Pat. No. 1,117,225), the pipe-receiving body is hinged. However, this hinged part must be able to cooperate with the cutters and notches. In the past this cooperation has been achieved at the expense of size. As can be seen in Sylvester, Anderson and Nash, when the lever arm is attached to the pipe-receiving body, the entire ratchet portion creates a body having a substantial circumference. This circumference is a disadvantage since the whole purpose of the ratchet pipe cutter is to allow cutting pipes with relatively small clearance available around the pipe. Of course, a larger circumference requires a larger clearance. Furthermore, the hinges of these pipe cutters interfere with the notches of the ratchet and the cutters. This interference has caused the notches to be made smaller and therefore more easily worn. It has also caused the cutters to be placed in unusual arrangements when it would be better to have them opposed to each other for offsetting the forces which must be exerted for cutting.

SUMMARY OF THE INVENTION

Accordingly, the present invention provides a ratchet pipe cutter having a pipe-receiving body and a lever means for rotating the pipe-receiving body in a ratchet motion. The pipe-receiving body has a turning gear at one end and a pipe cutting means at the other end. The pipe-receiving body comprises two longitudinal portions joined by a hinge to allow the pipe-receiving body to be opened and closed about a pipe. The hinge is disposed between the turning gear and the pipe cutting means. The lever means has a pawl for engaging the turning gear in a ratchet motion. The lever means has a race for receiving the turning gear.

From the description it can be seen that the present invention has several advantages over the prior art. First, the pipe-receiving body has three separate parts: a gear part, a pipe cutting part and a hinge part. These parts are longitudinally disposed with respect to each other which allows a smaller circumference than shown in the prior art. Also, the present invention uses hinges which are simpler and more reliable than the cutters which slide together. The present invention also provides a gear portion and cutting means which can be more efficient, reliable and reparable than those of the prior art. This improvement is allowed since the parts are separated from the joining connection (e.g., hinges) and each other.

For a further understanding of the invention and further objects, features and advantages thereof, reference may now be had to the following description taken in conjunction with the accompanying drawings.

DESCRIPTION OF PREFERRED EMBODIMENTS

Figure 1:
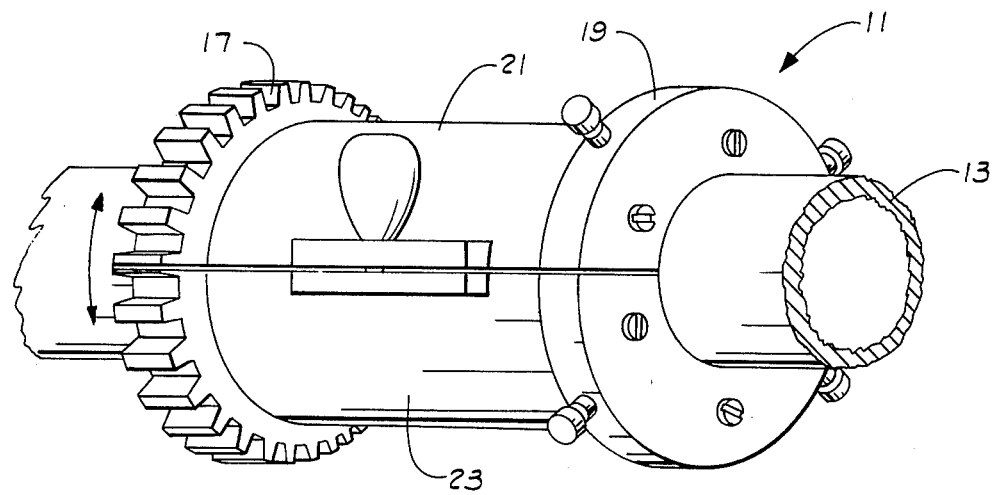
FIG. 1 is a side view of the pipe-receiving body of the present invention in place about a pipe.
Figure 2:
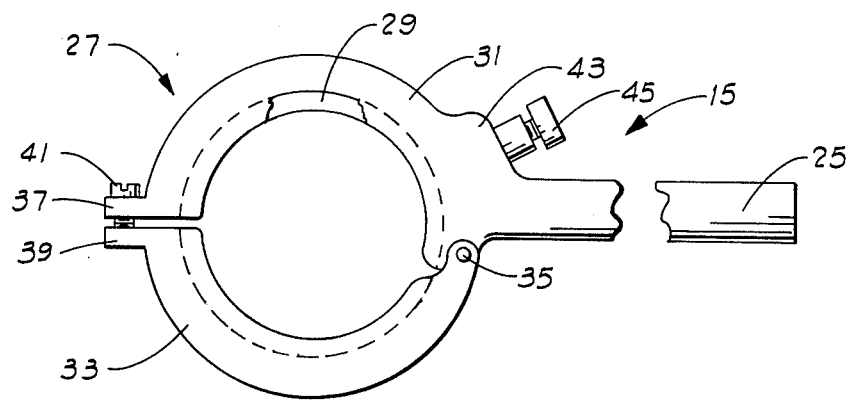
FIG. 2 is an end view of the lever means of the present invention.

Referring to FIGS. 1 and 2, the present invention is shown in two parts. The pipe-receiving body 11 is shown in FIG. 1 in position about a pipe 13. The lever arm 15 which fits about turning gear 17 for turning the pipe-receiving body 11 is shown in FIG. 2. As shown in FIG. 1, the pipe-receiving body 11 has a turning gear 17 disposed on its left end and a cutter housing 19 disposed on its right end. Pipe-receiving body 11 is divided longitudinally (along its length) into two portions: a top portion 21 and a bottom portion 23. This division allows the pipe-receiving body 11 to be opened and closed about a pipe.

Referring now to FIG. 2, the lever arm 15 will be described in more detail. The function of lever arm 15 is to fit about turning gear 17 and, upon manual operation of the lever, to engage gear 17 in a ratchet motion. This allows short movement of the lever bar 25 to incrementally move the pipe-receiving body 11 for cutting pipe. Lever bar 15 is attached to an annular member 27. The interior of annular member 27 has a race or guideway 29 for receiving turning gear 17. Annular member 27 is comprised of two portions 31 and 33 which are hinged together by hinge pin 35. This allows annular member 27 to be opened and closed about turning gear 17. Opposite hinge pin 35, portions 31 and 33 of member 27 have flanges 37 and 39, respectively, extending in a mating relation. A machine screw 41 is provided for joining flanges 37 and 39. Once flanges 37 and 39 are so joined, turning gear 17 is held securely inside race 29 for sliding therein.

Figure 3:
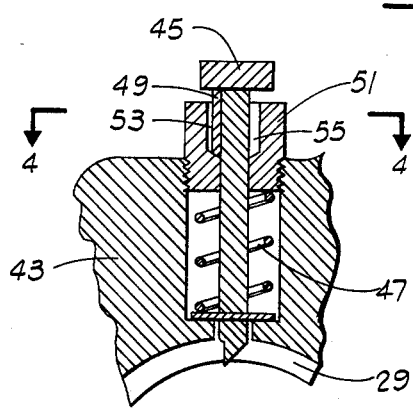
FIG. 3 is a cross-sectional view of the pawl and housing shown in FIG. 2 taken along the line shown in FIG. 4.

A raised portion 43 of annular member 27 adjacent to the connection to lever bar 25 forms a housing for pawl 45. FIG. 3 shows a cross-sectional view of pawl 45 and housing 43. The lower end of pawl 45 extends into race 29. This lower end engages turning gear 17 only in one direction since one side of this lower end extends radially into race 29 while the other side of the lower end forms an incline which allows turning gear 17 to raise the pawl when turning gear 17 encounters the incline. A spring 47 urges the pawl back into race 29 after it has been so raised. Thus, when lever arm 15 is turned counterclockwise as shown in FIG. 3, turning gear 17 would be engaged and pipe-receiving body 11 would be rotated. When lever arm 15 is turned clockwise as shown in FIG. 3, turning gear 17 would raise pawl 45 and pipe-receiving body 11 would not be rotated.

Figure 4:
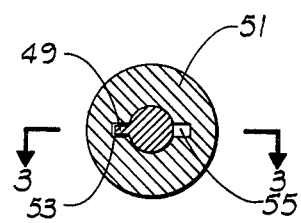
FIG. 4 is a cross-sectional view of the pawl shown in FIG. 2 taken along the line shown in FIG. 3.

FIG. 4 shows that pawl 45 can be selectively positioned to alternate the rotational direction of pipe-receiving body 11. The upper end of pawl 45 is cylindrical except for an extending flange 49. This upper end of pawl 45 is received by a cap 51 which is screwed into raised portion 43 of angular member 27. Cap 45 matingly receives the cylindrical portion of pawl 45 but has two opposing slots 53 and 55 for receiving flange 49. As can be seen in FIG. 3, pawl 45 can therefore be selectively positioned by locating flange 49 in either slot 53 or slot 55. Flange 49 and slots 53 and 55 are long enough to allow the pawl to be lifted by turning gears 17 without flange 49 being lifted out of the slot in which it resides. To move flange 49 from one slot to the other the pawl is grasped at its other end and raised until flange 49 is removed from its slot. The pawl is then rotated until flange 49 can be lowered into the other slot.

Figure 5:
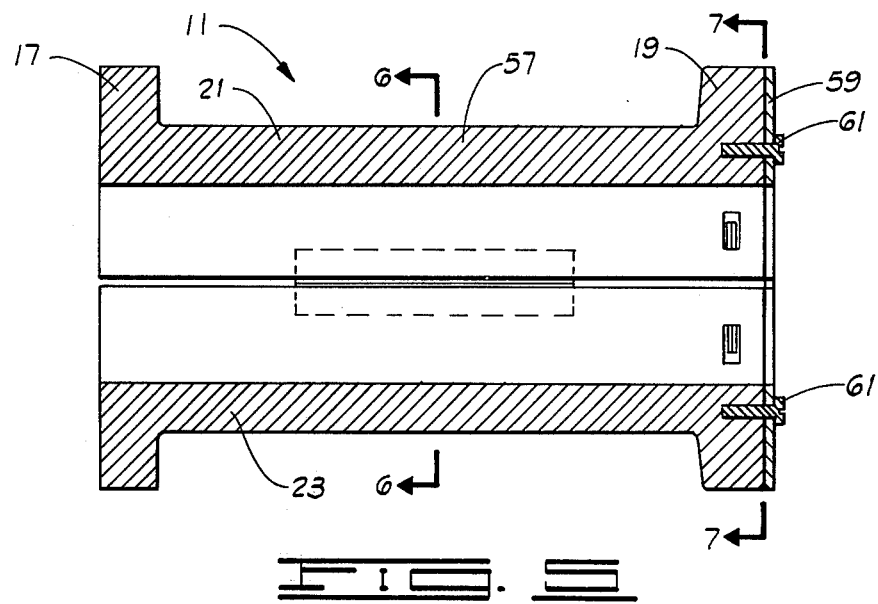
FIG. 5 is a cross-sectional view of the pipe-receiving body shown in FIG. 1, with the hinge member shown in dotted lines.

Referring now to FIG. 5, pipe-receiving body 11 is shown in cross-section without the pipe shown in FIG. 1. A single piece forms the turning gear 17 and the cutter housing 19 as well as the central portion 57 of the pipe-receiving body 11. As described above, turning gear 17 is disposed on one end of body 11 and cutter housing 19 is disposed on the other end of body 11. A plate 59 covers the end of cutter housing 19 and is held in place by screws 61.

Turning gear 17 has an annular portion which is raised from the central part of body 11. This allows race 29 of annular member 27 to fit into position about gear 17. A plurality of gear teeth extend radially outward from the raised annular portion. The walls of these teeth are radially steep in order to properly engage pawl 45. These teeth are regularly spaced apart from each other.

Figure 6:
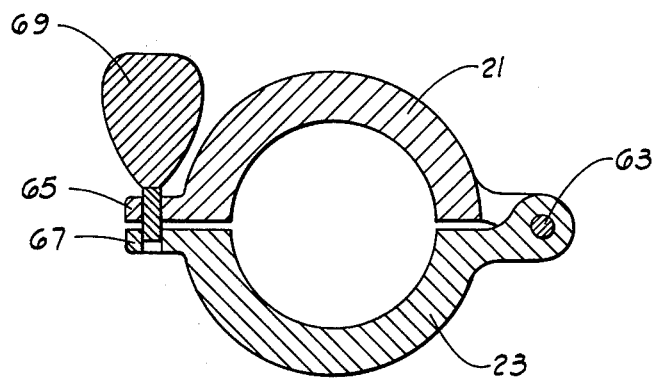
FIG. 6 is a cross-sectional view of the pipe-receiving body shown in FIG. 5.

Pipe-receiving body 11 has an upper portion 21 and a lower portion 23. These portions are hinged together by a hinge pin 63, shown in FIG. 6. The whole hinge is shown in dotted lines in FIG. 5. Opposite the hinge, upper portion 21 and lower portion 23 have flanges 65 and 67, respectively, extending in a mating relation. A finger bolt 69 is provided for joining these two flanges. When flange 65 and flange 67 are joined by bolt 69 a pipe is held securely within pipe-receiving body 11 for rotation therein.

Figure 7:
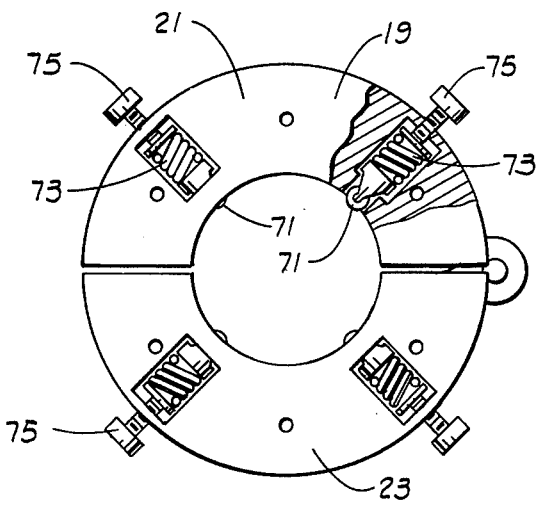
FIG. 7 is an end view of the pipe-receiving body of FIG. 5 with the end plate removed.

FIG. 7 shows an end view of cutter housing 19 with plate 59 removed. Four cavities are disposed in cutter housing 19 which cavities contain the cutter parts. These four cavities are arranged such that each cavity is disposed 90° to its neighboring cavities and 45° to the line of separation between upper portion 21 and lower portion 23 of body 11. This arrangement places each cutting force opposite an equal cutting force which provides more uniform cutting. Furthermore, this arrangement directs the cutting forces so that the tendency to open body 11 is reduced.

Still referring to FIG. 7, each of the four cavities is connected to the interior of the cutter housing by a slot. A cutting wheel 71 extends through each slot to provide a cutting edge for cutting the pipe. Cutting wheels 71 are able to move radially inward as cutting occurs to maintain a proper cutting pressure. A spring 73 above each cutting wheel urges the cutting wheel 71 inwardly. The amount of tension in spring 73 can be varied by turning a screw 75 which raises or lowers a plate above each spring 73. Each screw 75 extends out from the outer edge of cutter housing 19 in order to allow manual adjustment of the tension in spring 73 during cutting.

In operation, pipe-receiving body 11 is first opened and placed about a pipe. Next, annular member 27 of lever arm 15 is opened and placed about turning gear 17. Bolt 41 is fastened to secure turning gear 17 within race 29. Pawl 45 is rotated to provide the proper rotational direction of body 11 in response to movement of the lever arm 15. Screws 75 are adjusted to apply the proper cutting pressure to cutting wheel 71. The pipe cutter is now ready for cutting.

During the cutting process the end of lever bar 25 is manually moved back and forth through an arc about the pipe in order to turn body 11 which causes the cutting wheels to rotate on and cut the pipe. Lever bar 25 need only travel through a short arc in order for the ratchet action to rotate pipe-receiving body 11 in one direction for cutting. During cutting, screw 75 can be adjusted to maintain or alter the cutting pressure on cutting wheel 71. Also, if desired, the rotational direction of pipe-receiving body 11 can be reversed by turning pawl 45 to its other slot.

Thus, the pipe cutter of the present invention is well adapted to attain the objects and advantages mentioned as well as those inherent therein. While presently preferred embodiments of the invention have been described for purposes of this disclosure, numerous changes in the construction and arrangement of parts can be made by those skilled in the art, which changes are encompassed within the spirit of this invention as defined by the appended claims.

The foregoing disclosure and the showings made in the drawings are merely illustrative of the principles of this invention and are not to be interpreted in a limiting sense.

What I claim is:

1. A pipe cutter comprising:

a cylindrical pipe-receiving body having a turning gear at one end thereof, a pipe cutting means at the other end thereof and a central portion disposed longitudinally therebetween connecting said pipe cutting means and said turning gear, said pipe-receiving body comprising two longitudinal portions joined by a hinge to allow said pipe-receiving body to be opened and closed about a pipe, said hinge being disposed longitudinally on said central portion between said turning gear and said pipe cutting means such that said hinge does not contact and does not extend into said turning gear and said pipe cutting means; and lever means for rotating said pipe-receiving body about a pipe, said lever means having a lever arm for manual operation of the pipe cutter and a pawl for engaging said turning gear in a ratchet motion, and said lever means having a race for receiving said turning gear.

2. The apparatus of claim 1 wherein said pawl can be selectively positioned to alternate the rotational direction of said pipe-receiving body in response to said lever means.

3. The apparatus of claim 2 wherein the cutting means comprises cutting wheels.

4. The apparatus of claim 3 wherein the cutting wheels are disposed in pairs, each cutting wheel of each pair being axially opposite its respective paired cutting wheel with respect to the pipe axis of said pipe-receiving body.

5. The apparatus of claim 4 wherein said cutting means has at least two pairs of said cutting wheels.

6. The apparatus of claim 5 wherein said cutting wheels are disposed at angles about 45° from a plane which is perpendicular to the plane of separation of said pipe-receiving portions and which is parallel to the axis of said pipe-receiving body.

7. The apparatus of claim 2 wherein said lever means has two portions which are hinged to allow the lever means to be opened and closed about said turning gear.

8. The apparatus of claim 1 wherein said turning gear is raised such that said turning gear extends from said central portion of said pipe-receiving body for being received in said race.

9. The apparatus of claim 1 wherein said hinge is disposed on the exterior of said central portion longitudinally between said turning gear and said cutting means.

10. A ratcheting pipe cutter comprising:

a cylindrical pipe-receiving body having a raised cylindrical turning gear at one end thereof, a raised cylindrical pipe cutter housing at the other end thereof, and a cylindrical central portion therebetween connecting said pipe cutter housing and said turning gear, said pipe-receiving body having two separate longitudinal portions joined by a hinge to allow said pipe-receiving body to be opened and closed about a pipe, said hinge being disposed on the exterior of said central portion between said turning gear and said pipe cutter housing such that said hinge does not contact and does not extend into said turning gear and said pipe cutter housing;

pipe cutting disposed within said pipe cutter housing; and lever means for rotating said pipe-receiving body about a pipe in a ratchet motion, said lever means having a lever arm for manual operation of the pipe cutter and a pawl for engaging said turning gear in a ratchet motion, and said lever means having a race for receiving said turning gear.

* * * * *